(12) United States Patent
Cho et al.

(10) Patent No.: US 10,861,613 B2
(45) Date of Patent: Dec. 8, 2020

(54) PLASMA FURNACE

(71) Applicant: KOREA HYDRO & NUCLEAR POWER CO., LTD., Gyeongsangbuk-do (KR)

(72) Inventors: Hyun-Je Cho, Daejeon (KR);
Cheon-Woo Kim, Daejeon (KR);
Young-II Kim, Daejeon (KR);
Young-Hwan Hwang, Daejeon (KR);
Sang-Woon Shin, Chungcheongnam-do (KR)

(73) Assignee: KOREA HYDRO & NUCLEAR POWER CO., LTD., Gyeongsangbuk-do (KR)

( * ) Notice: Subject to any disclaimer, the term of this patent is extended or adjusted under 35 U.S.C. 154(b) by 298 days.

(21) Appl. No.: 15/750,272

(22) PCT Filed: Sep. 17, 2015

(86) PCT No.: PCT/KR2015/009775
§ 371 (c)(1),
(2) Date: May 9, 2018

(87) PCT Pub. No.: WO2017/026576
PCT Pub. Date: Feb. 16, 2017

(65) Prior Publication Data
US 2018/0261347 A1 Sep. 13, 2018

(30) Foreign Application Priority Data
Aug. 12, 2015 (KR) .................. 10-2015-0114044

(51) Int. Cl.
*H05B 7/00* (2006.01)
*F23G 5/08* (2006.01)
(Continued)

(52) U.S. Cl.
CPC ............. *G21F 9/308* (2013.01); *F23G 5/085* (2013.01); *F23G 5/444* (2013.01); *F23G 5/448* (2013.01);
(Continued)

(58) Field of Classification Search
CPC . F27B 3/04–186; H05B 7/00; F23G 5/08–18; F23G 2204/20–204; C03B 5/02–025; F27D 2099/0031
See application file for complete search history.

(56) References Cited

U.S. PATENT DOCUMENTS 3,744,438 A 7/1973 Southwick
5,028,248 A * 7/1991 Williams ................ C03B 5/025
373/20

(Continued)

FOREIGN PATENT DOCUMENTS

CA 2457335 A1 8/2004
JP 2001254927 A 9/2001
(Continued)

OTHER PUBLICATIONS

English translation of KR 102001081375 to Park (Year: 2001).*
English translation of JP 2002228137 to Inoue (Year: 2002).*

*Primary Examiner* — Michael A Laflame, Jr.
(74) *Attorney, Agent, or Firm* — Standley Law Group LLP (57) ABSTRACT

The present invention relates to a plasma furnace which can efficiently treat various types of waste in large amounts. The plasma furnace comprises a melting chamber 101 for accommodating a melt, an upper surface forming the upper portion of the melting chamber 101 with a horizontal upper surface 111 and an inclined upper surface 112 having a slope with respect to the horizontal upper surface 111, a melt discharge portion 130 formed through a bottom surface of the melting chamber for discharging molten material there-
(Continued)

through, and an input apparatus 120 having a slope for inputting waste into the melting chamber 101, and the mixed type plasma torch 191, 192 provided on the inclined upper surface 112 with a slope for generating melting heat in the melting chamber 101.

8 Claims, 9 Drawing Sheets

(51) Int. Cl.

| | | |
|---|---|---|
| *C03B 5/02* | (2006.01) | |
| *G21F 9/30* | (2006.01) | |
| *F27B 17/00* | (2006.01) | |
| *F27B 3/04* | (2006.01) | |
| *F23G 5/44* | (2006.01) | |
| *F27D 3/00* | (2006.01) | |
| *F27D 3/14* | (2006.01) | |
| *F27D 11/08* | (2006.01) | |
| *F27D 99/00* | (2010.01) | |

(52) U.S. Cl.
CPC ............ *F27B 3/045* (2013.01); *F27B 17/00* (2013.01); *F27D 3/003* (2013.01); *F27D 3/14* (2013.01); *F27D 11/08* (2013.01); *G21F 9/30* (2013.01); *F23G 2209/18* (2013.01); *F27D 2099/0031* (2013.01)

(56) References Cited

U.S. PATENT DOCUMENTS

| | | | |
|---|---|---|---|
| 5,069,429 A | | 12/1991 | Auberger et al. |
| 5,280,757 A | * | 1/1994 | Carter .................... C01B 7/191 110/346 |
| 5,548,611 A | * | 8/1996 | Cusick .................. B09B 3/0066 373/18 |
| 6,155,182 A | * | 12/2000 | Tsangaris ................ F23G 5/008 110/229 |
| 6,532,768 B1 | * | 3/2003 | Labrot .................. B09B 3/0066 110/185 |
| 7,644,668 B2 | | 1/2010 | Kuo et al. |
| 7,665,407 B2 | | 2/2010 | Hwang |
| 2007/0095258 A1 | * | 5/2007 | Kuo ....................... F23G 5/444 110/250 |
| 2014/0309474 A1 | | 10/2014 | Hwang |
| 2015/0098484 A1 | | 4/2015 | Cho et al. |

FOREIGN PATENT DOCUMENTS

| | | |
|---|---|---|
| JP | 2003-317930 A | 11/2003 |
| JP | 2012132631 A | 7/2012 |
| KR | 10-0334439 B1 | 8/2002 |
| KR | 20-0343807 | 5/2004 |
| KR | 20120128752 A | 11/2012 |
| KR | 10-1418105 B1 | 7/2014 |
| WO | 9514191 A1 | 5/1995 |

* cited by examiner

PLASMA FURNACE

TECHNICAL FIELD

The present invention relates to a plasma furnace which can efficiently treat various types of waste in large amounts.

BACKGROUND ART

Radioactive wastes are classified as medium and low level waste, and high level waste including nuclear fuels used. Solid-state waste among the medium and low level radioactive wastes, includes working clothes, gloves, overshoes, mops, and equipment replacement parts used in nuclear power plants and also includes sludge, concentrated waste fluid, ion exchange resin and the like generated secondarily by treatment such as coagulating precipitation, evaporation, and ion exchange for radioactive waste generated from liquid-state waste. In addition, there are reagent bottles, syringes, tubes and the like generated in the department of radiology of hospitals and industrial research institutes using a radioactive isotope.

In general, medium and low level radioactive waste is larger and more various than high level radioactive waste in generation amount and types. For concentrated wastewater, spent ion exchange resins, incineration ashes, and dried matter of concentrated waste solution which generally have a risk of scattering and spreading appropriate solidification medium is used to minimize leakage of radionuclides to the environment.

Plasma furnaces are typically used to dispose of radioactive waste generated from nuclear power plants. The plasma furnace melts non-combustible materials such as metals and concrete, thereby reducing the volume. The treated waste can be stably stored in a radioactive waste repository for good.

When a plasma torch method is used for heating and melting a target material in a plasma furnace, a plasma torch has been utilized as a heat source in a top, side, or bottom of a furnace. In this case, the operation of the plasma torch may be limited depending on the structure of the furnace, and the generated plasma cannot maintain uniform heat in the furnace.

The plasma torch inserted into the conventional plasma furnaces has a problem in that it needs to additionally include not only a main heating torch but a preheating torch for pre-heating target material in order to transfer sufficient heat into the furnace. Also, the plasma torch used in a large scale or large sized furnace has a disadvantage in terms of thermal efficiency, operation and maintenance of the torch since it is required to have more than a necessary amount of output.

Recently, a large-sized furnace for directly processing a 200 L drum scale is used to increase the throughput of a target material, and a MW (mega watt) scale plasma torch is applied in consideration of the heat loss in the furnace and the torch.

CITATION LIST

Korean Patent No. 10-1032055 (Publication Date: May 5, 2011)

Korean Utility Model No. 20-0343807 (Publication Date: May 17, 2004)

DISCLOSURE

Technical Problem

The present invention is intended to solve the above problems occurring in the prior arts, and provide a plasma furnace capable of efficiently processing various wastes.

Technical Solution

A plasma furnace according to the present invention in order to achieve the above purpose may comprise a furnace body and a mixed type plasma torch, wherein the furnace body comprises a melting chamber for accommodating a melt, an upper surface forming the upper portion of the melting chamber with a horizontal upper surface and an inclined upper surface having a slope with respect to the horizontal upper surface, a melt discharge portion formed through a bottom surface of the melting chamber for discharging molten material therethrough, and an input apparatus having a slope for inputting waste into the melting chamber, and wherein the mixed type plasma torch is provided on the inclined upper surface with a slope for generating melting heat in the melting chamber.

Preferably, the input apparatus and the inclined upper surface are provided in directions opposite to each other based on the furnace body.

Preferably, the input apparatus comprises a drum waiting portion provided with a slope to be charged with a waste drum; a pusher provided movable back and forth in the drum waiting portion for pushing the waste drum into the melting chamber; and a guide support for guiding the input of the waste drum by connecting the drum waiting portion and the lateral inlet of the furnace body.

More preferably, the input apparatus comprises a slide gate capable of opening and closing by sliding and provided on the upper portion of the drum waiting portion, and an input gate capable of opening and closing vertically by separating the drum waiting portion and the guide support spatially.

Preferably, the melt discharge portion includes a dam-type discharge gate provided to protrude from the lower portion of the melting chamber to discharge molten material above a predefined height.

More preferably, the dam-type discharge gate further comprises an induction heater.

Preferably, the furnace body further comprises at least two lateral discharge gates capable of discharging molten material at different heights on the side of the melting chamber; and a heating portion capable of heating the lateral discharge gate.

More preferably, it further comprises a discharge chamber which is provided on the lateral portion of the furnace body to accommodate the molten material discharged along the lateral discharge gate and have an outlet formed at the lower portion thereof.

Advantageous Effects

A plasma furnace according to the present invention is provided so that the upper portion of the melting chamber of the furnace body is formed and a part of the upper surface on which the plasma torch is installed is provided with a constant inclined surface. Accordingly, the torch in the melting chamber is smoothly operated, and plasma heat source generated by the torch can easily keep balanced up to the upper portion of the furnace.

In addition, the present invention provides a structure in which nozzles of a mixed type plasma torch can be disposed in close proximity to an input apparatus for inputting a waste drum. Accordingly, there is no need to make a torch with an excessively large size in consideration of heat loss while stability of the torch can be maintained.

BEST MODE

The specific structure or functional description presented in the embodiments of the present invention is merely illustrative for the purpose of describing an embodiment according to the concept of the present invention, and embodiments according to the concept of the present invention may be embodied in various forms, and should not be construed as limited to the embodiments set forth herein, but should be understood to include all modifications, equivalents, and alternatives falling within the spirit and scope of the invention.

On the other hand, in the present invention, the terms such as a first and/or second etc. may be used to describe various components, but the components are not limited to the terms. The terms may be referred only for the purpose of distinguishing one component from another component. For example, the first component may also be referred to as a second component to the extent not departing from the scope of the invention in accordance with the concept of the present invention; likewise, the second component may also be referred to as a first component.

It is to be understood that when an element is referred to as being "connected" or "coupled" to another element, it may be directly connected or coupled to the other element, but it should be understood that other elements may be present in between. On the other hand, when it is mentioned that an element is directly connected or directly coupled to another element, it should be understood that there are no other elements in between. Other expressions for describing the relationship between components, such as "between" and "between" or "adjacent to" and "directly adjacent to" and the like should also be interpreted likewise.

The terminology used herein is for the purpose of describing particular embodiments only and is not intended to limit the invention. The singular forms include plural referents in meaning unless the context clearly dictates otherwise. It is to be understood that the terms "include", "have", "comprise" and the like in the specification are intended to specify the presence of stated features, integers, steps, operations, elements, parts, or combinations thereof, but they shall not preclude the presence or addition of one or more other features, integers, steps, operations, elements, parts, or combinations thereof.

Hereinafter, the present invention will be described in detail with reference to the accompanying drawings.

Figure 1:
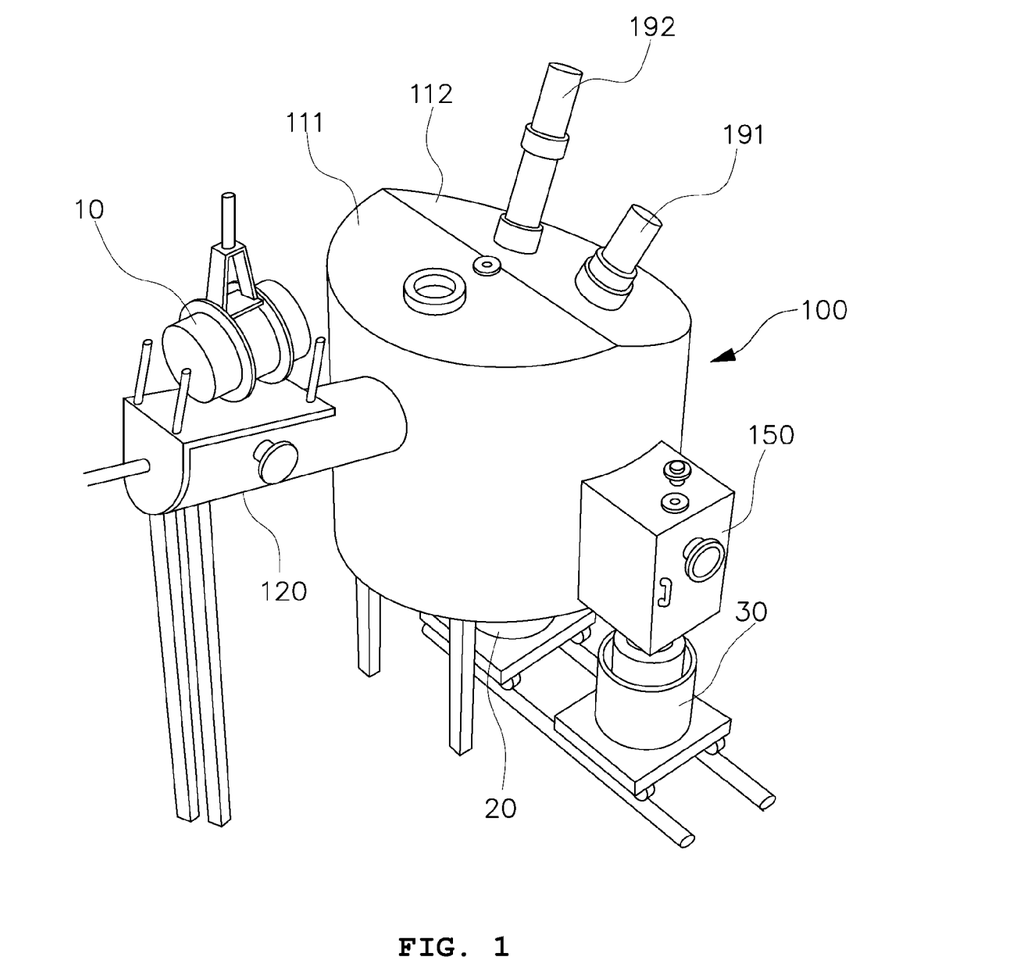
FIG. 1 is a perspective view of a plasma furnace according to a first embodiment of the present invention.
Figure 2:
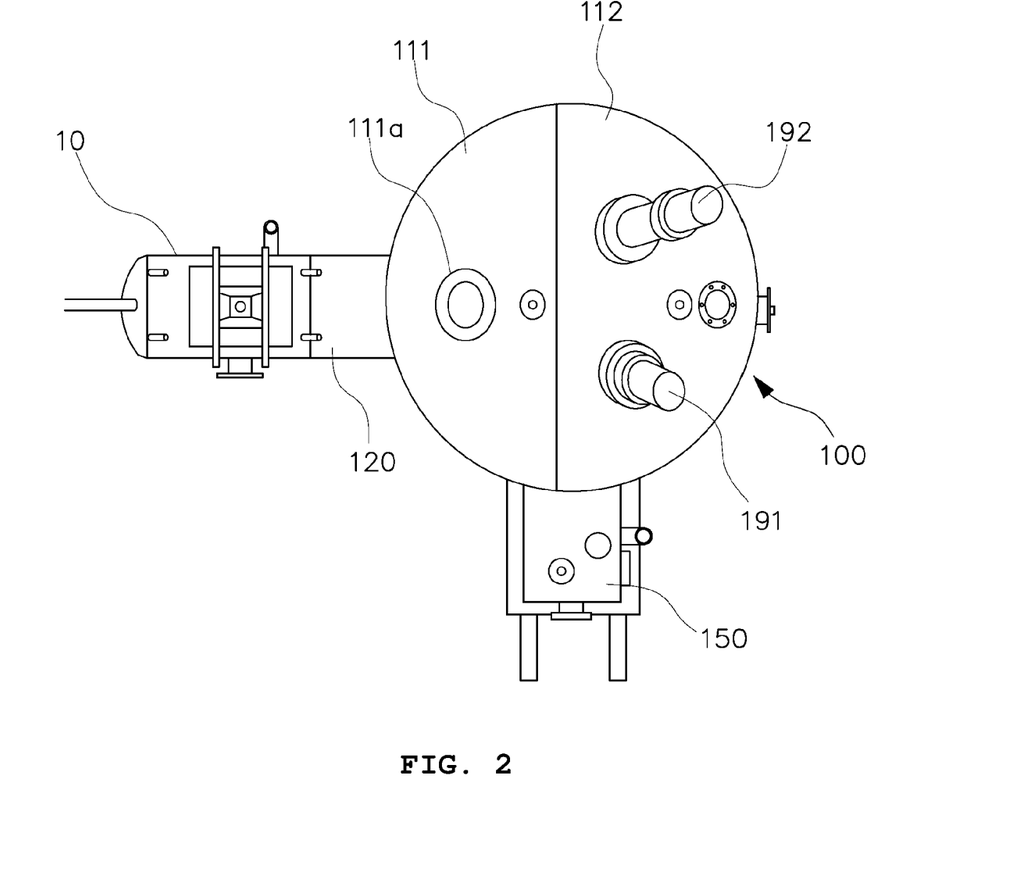
FIG. 2 is a plan view of a plasma furnace according to a first embodiment of the present invention.
Figure 3:
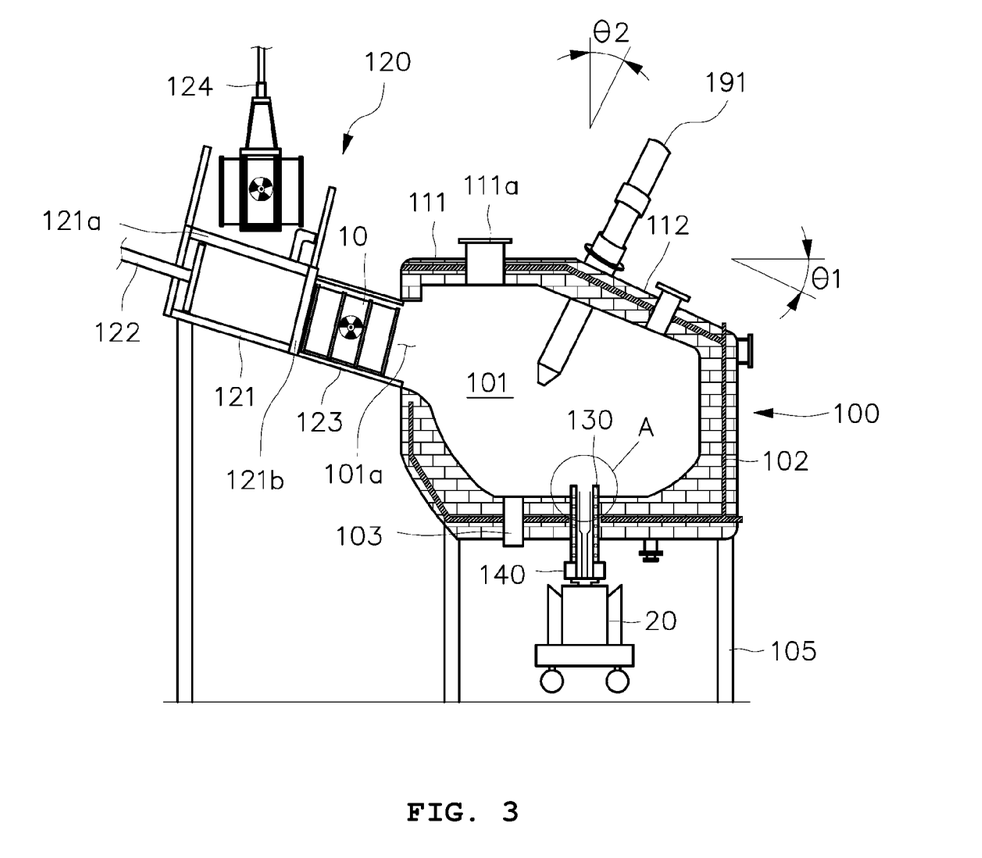
FIG. 3 is a cross-sectional view of a plasma furnace according to the first embodiment of the present invention.

As illustrated in FIGS. 1 to 3, the plasma furnace according to the first embodiment of the present invention comprises a furnace body 100 provided with a melting chamber 101 for accommodating molten material, and a plasma torch 191, 192 for generating melting heat in the melting chamber 101.

The furnace body 100 may be made of a material having excellent heat resistance such as a heat resisting brick, and a metal material may be further used together for structural reinforcement. A cooling channel 102 is formed inside the furnace body 100 so that the outer surface of the furnace body 100 is maintained at an appropriate temperature (below 60° C.) by circulation of cooling water.

On the other hand, the melting chamber (101) is a structure capable of maintaining a negative pressure during operation and it is desirable to keep down dust generation and splashing of the molten material as much as possible.

An upper input portion 111a is provided on the upper portion of the furnace body 100 and a separate input apparatus 120 is provided on the side portion so that waste can be input.

Specifically, the upper input portion 111a can be provided by a small-diameter (approximately 20 cm) input pipe and non-drum-shaped combustible waste can be input.

The input apparatus 120 is installed at the lateral inlet 101a formed through the side of the furnace body 100 such that direct input of the waste drum 10 of 200L can be made.

Specifically, the input apparatus 120 comprises a drum waiting portion 121 provided with a slope to be charged with a waste drum 10, a pusher 122 provided movable back and forth in the drum waiting portion for pushing the waste drum 10 into the melting chamber 101, and a guide support 123 for guiding the input of the waste drum 10 by connecting the drum waiting portion 121 and the lateral inlet 101a of the furnace body 100.

The drum waiting portion 120 is provided to have a gentle slope in a range of approximately 20 to 45 degrees so that the waste drum 10 can be input along the inclined surface. Accordingly, the waste drum 10 is input into the melting chamber 101 along a gently inclined surface, thereby minimizing the impact that may be applied to the furnace body 100.

The drum waiting portion 121 preferably comprises a slide gate 121a provided on the upper portion which is sliding openable; and an input gate 121b for spatially separating the drum waiting portion 121 and the guide support 123 and being vertically openable.

Regarding the input apparatus 120 configured as aforementioned, when the slide gate 121a is opened, the waste drum 10 is positioned on the drum waiting portion 121 by the conveying crane 124. While the slide gate 121a is closed afterward, the inlet gate 121b is opened and the pusher 122 is operated for inputting the waste drum 10 on the drum waiting portion 121 into the melting chamber 101.

Accordingly, in the present invention, the waste drum 10 can be charged as its original form into the melting chamber 101, and the opening and closing operations of the slide gate 121a and the inlet gate 121b can prevent the inflow of outside air and the gas generated in the melting chamber 101 from being discharged to the outside.

In general, the medium and low level wastes generated in nuclear power plants are stored in a closed 200L drum container. The wastes stored in drums are collected and stored in various forms, and the wastes comprise a variety of components having characteristic such as flammable, inorganic, etc. Therefore, it is difficult to separate and treat the radioactive waste stored in the 200L drum separately because of the concern on secondary contamination. Therefore, it is very important that a series of stabilization treatments such as waste input, crushing, combustion and melting, etc. should be continuously made in a single furnace. Accordingly, in the present invention, the waste drum moved from the repository can be introduced in its original form into the furnace, go through the melting treatment to the final disposal stage.

As illustrated in FIG. 3, the furnace body 100 has a cylindrical shape as a whole. The upper portion of the melting chamber 101 is formed by the upper surface 111, 112 comprising a horizontal upper surface 111, and an inclined upper surface 112 having a predefined angle (θ1) to the rear and lower direction.

On the other hand, the upper portion comprising the horizontal upper surface 111 and the inclined upper surface 112 may be provided in an integrated structure with the furnace body 100 or the upper portion 111, 112 may be provided as separable from the furnace body 100 such that the convenience of maintenance of the furnace body (100) can be improved.

The horizontal upper surface 111 may be provided with an upper input portion 111a which is substantially horizontal with the ground and through which waste can be input. The inclined upper surface 111 has a slope at a predetermined angle θ1 in a down direction with respect to the horizontal upper surface 111. Plasma torches 191, 192 are provided on the upper surface 112 with a predefined angle θ2 with respect to the vertical direction.

It should be understood that the horizontal upper surface 111 in the present invention does not mean that the horizontal upper surface 111 is horizontal with respect to the ground in an absolute sense, but may be provided substantially horizontally relative to the inclined upper surface 112. Accordingly, the horizontal upper surface 111 may have a slope within an angle range smaller than the slope angle θ1 of the inclined upper surface 112.

Each of the plasma torches 191, 192 installed on the inclined upper surface 112 is provided with a separate guide member (not shown) and a driving source (not shown) so as to adjust the insertion length in the vertical direction for the transitional operation.

Since the plasma torches 191, 192 are installed on the inclined upper surface 112 as described above, the flame generated in the plasma torch is uniformly distributed in the melting chamber 101. In addition, although the plasma torches keep a small range of vertical movement, stable output can be obtained.

On the other hand, the slope angle θ1 of the inclined upper surface 112 and the slope angle θ2 of the plasma torches 191, 192 may be different from each other or may be the same.

Preferably, the inclined upper surface 112 is provided so as to be positioned opposite to the input apparatus 120 installed at one side of the furnace body 100 so that the nozzle at the lower end of the plasma torch 191, 192 can point to the input apparatus 120. Accordingly, sufficient melting heat can be provided to the position where the waste drum 10 is input and a separate plasma torch can be excluded for cutting and crushing the waste drum 10.

Preferably, the plasma torches 191, 192 in the present invention may be composed of a first plasma torch 191 and a second plasma torch 192 of a mixed type in which operations are performed independently of each other.

The bottom electrode 103 is provided on the bottom surface of the furnace body 110 in parallel with the direction of the nozzle of the torch so that the transitional operation of the mixed type plasma torch can be performed and the bottom electrode 103 can be detachably attached to the furnace body 110.

When one of the two plasma torches 191, 192 that can be operated independently is in operation, the other one can be on call as a spare. Accordingly, when the operation is not performed smoothly due to reasons such as a failure in supply of working gas to the torch in operation, the other torch on call can be operated. The operation control of these two plasma torches can be controlled automatically by interlocking with a separate torch monitoring device.

In addition, the mixed type plasma torches 191, 192 installed on the inclined upper surface 112 are arranged in the vicinity of the charging direction of the waste drum 10 charged into the melting chamber 101 through the input apparatus 120 thereby, allowing a structure where a torch nozzle can be arranged. When the waste drum 10 is charged into the melting chamber, the waste drum 10 is crushed through the preheating by the back and forth movement of the torch. When the contents are fallen out of the waste drum 10 to the floor, torch stability can be maintained by moving the torch up and down quickly when pouring on the floor.

A melt discharge portion is provided in the lower portion of the furnace body 100, and in particular, a melt discharge portion is provided by a dam-type discharge gate 130, and preferably further includes an induction heating type heater.

A first clamp 140 may be provided at the lower end of the dam-type discharge gate 130 so as to be detachably coupled to a first mold apparatus 20. The first clamp 140 may be connected to the first mold apparatus 20 with a hermetic seal, Accordingly, when the molten material is discharged into the first mold apparatus 20, the outside air cannot flow into the inside of the furnace, and the atmosphere inside the furnace can be maintained.

On the other hand, the first clamp 140 may be provided with a packing member such as a gasket or a synthetic rubber so that the first clamp 140 can be assembled with the first mold apparatus 20 in an airtight state. A cooling circuit may be provided to have the cooling water circulated to the first clamp 140 or its periphery so as to prevent degradation of the packing member due to a high temperature.

Figure 4:
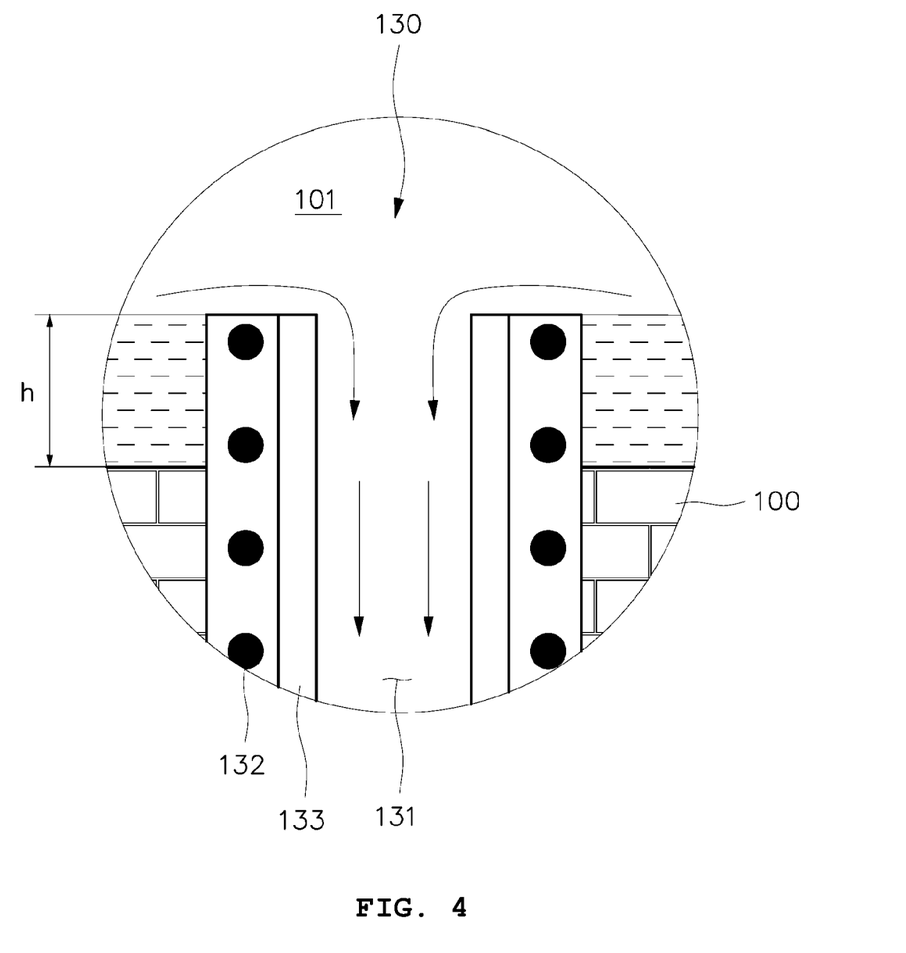
FIG. 4 is an enlarged view of part A in FIG. 3.

Specifically referring to FIG. 4, the dam-type discharge gate 130 is formed to protrude from the bottom surface of the furnace body 100 by a predetermined height, h or more and may include an induction coil 132 provided to surround the lower outlet 131, and an exhaust tube 133, that is, an electric conductor for indirect induction heating provided inside the induction coil 132.

Accordingly, even if the molten material in the melting chamber 101 is completely discharged through the dam-type discharge gate 130, the molten material under a predetermined height (h) remains in the melting chamber 101 at all times. Before the waste is introduced, the inner wall of the melting chamber 101 is prevented from being directly exposed to a high temperature by the high-temperature plasma generated in the plasma torch in the preheating process.

On the other hand, when the power is not applied to the induction coil 132 at the dam-type discharge gate 130, the molten material becomes a solid in a high viscosity state to close the lower outlet 131. When the power is applied, the solid becomes thin to be discharged to the outside through the lower outlet 131 by its own weight.

The melt discharge portion provided at the lower portion of the furnace body 100 may be used for discharging a metal material having a large specific gravity among the molten material or for discharging the entire molten material.

Reference numeral 105 denotes a lower support structure for supporting the furnace body 100.

Referring to FIGS. 1 and 2, a discharge chamber 150 which accommodates the molten material discharged through a plurality of lateral discharge gates and is capable of discharging it may be further included in the side of the furnace body 100.

Figure 5:
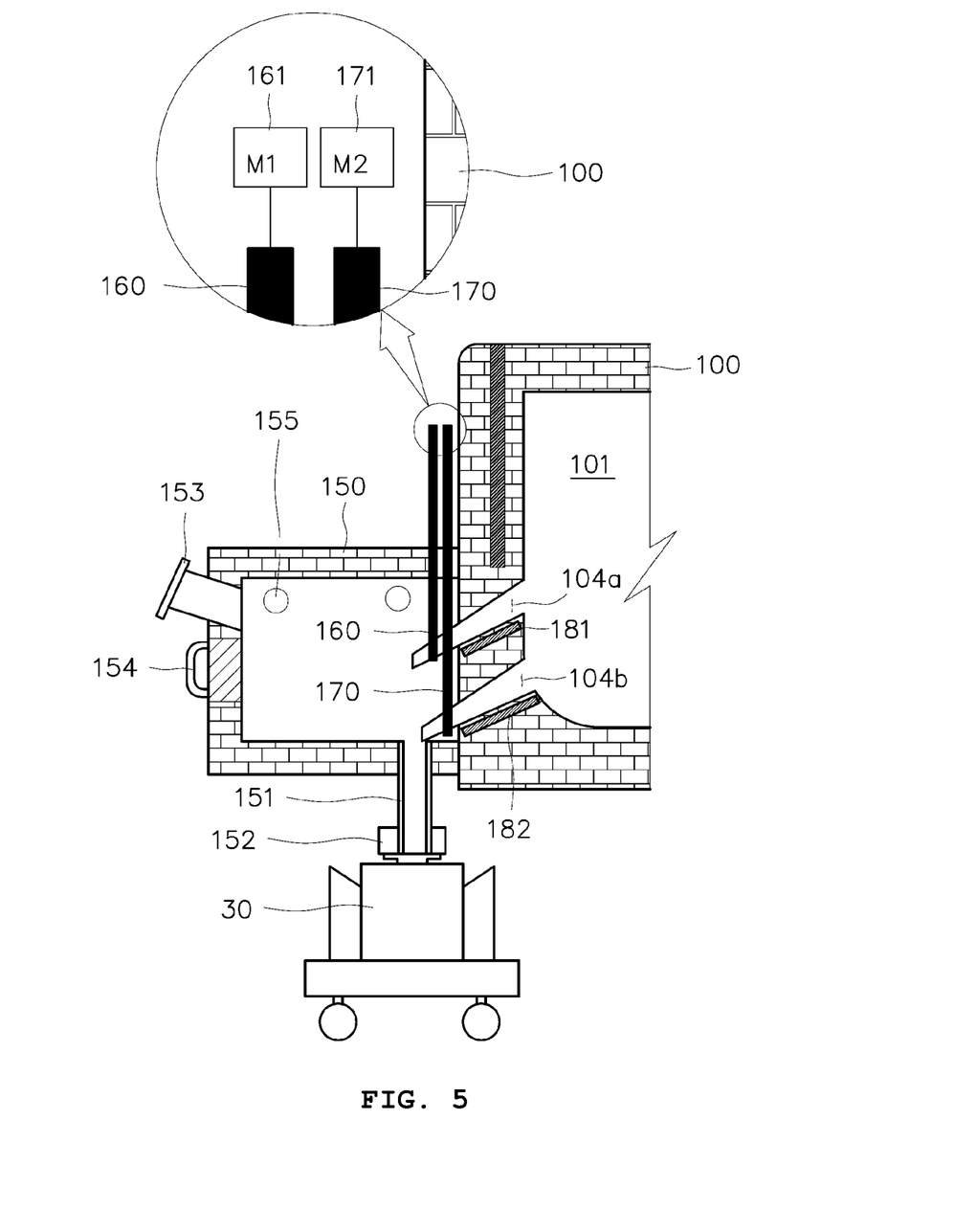
FIG. 5 is a sectional view of a discharge chamber of a plasma furnace according to the first embodiment of the present invention.

Referring to FIG. 5, the furnace body 100 is provided with lateral discharge gates 160, 170 for discharging the molten material at different heights on the sides of the melting chamber 101, and the heating portion 181, 182 capable of heating the lateral discharge gates 160 is further included.

Each lateral discharge gate 160, 170 is provided with a motor-operated or hydraulic drive unit 161, 171 to open and close each discharge flow path 104a, 104b formed in the furnace body 100 by a vertical movement.

Each discharge flow path 104a, 104b is formed with a predetermined slope through the furnace body 100 so that the molten material can be easily discharged to the outside by its own weight. A heating portion 181, 182 is provided adjacent to the discharge flow path 104a, 104b to maintain the discharged molten material at a melting temperature (1600° C.) or higher.

The heating portion 181, 182 may be provided as a metal or non-metal heat generating material and may be formed as a wire or a plane depending on the size and length of the discharge flow path 104a, 104b. On the other hand, it can be provided by an induction heating-type heat source as another embodiment of the heating portion.

In this embodiment, it is exemplified that a heating element is provided in each discharge flow path 104a, 104b. However, the two discharge flow paths 104a, 104b may be heated by one common heating element.

Preferably, a discharge chamber 150 provided at the side of the furnace body 100 may be further comprised to accommodate the molten material discharged from each lateral discharge gate 160, 170.

The discharge chamber 150 may be an enclosed structure integrated with the furnace body 100 or may be a detachable structure with the furnace body 100. Meanwhile, when the discharge chamber 150 is provided as a detachable structure with the furnace body 100, a hermetic member may be added between the discharge chamber 150 and the furnace body 100 to maintain a hermetic seal.

The discharge chamber 150 is provided with a slag outlet 151 at a lower portion thereof and a second clamp 152 at a lower end of the slag outlet 151 to which the second mold apparatus 30 is detachably coupled. The second clamp 152 is connected to the second mold apparatus 30 with a hermetic seal. Accordingly, when the molten material, slag is discharged into the second mold apparatus 30, outside air cannot flow into the discharge chamber 150 and the atmosphere inside the furnace can be maintained.

The second clamp 152 may be provided with a packing member such as a gasket or a synthetic rubber so that the second clamp 152 can be assembled with the second mold apparatus 30 in an airtight state. A cooling circuit may be provided to have the cooling water circulated to the second clamp 152 or the periphery thereof so as to prevent degradation of the packing member due to a high temperature.

The discharge chamber 150 may be provided with an observation window 153 for observing the discharge gate 160, 170 and may be provided with a surveillance camera (not shown) capable of capturing an image signal.

The discharge chamber 150 may be provided with a door 154 that can be opened and closed at the front thereof so as to be able to collect a sample when the molten material is discharged. In the discharge chamber 150, a heating means 155 may be provided so as to control the temperature inside the discharge chamber 150. Such a heating means 155 may be provided by molybdenum disilicide, $M_0Si_2$, which is effective as a heating element even at a high temperature of 1,500° C. or higher.

In FIG. 5, the lateral discharge gate 160, 170 is provided outside the furnace body 100 to be opened and closed. However, the lateral discharge gate may be provided inside the furnace body or in the melting chamber to discharge the molten material.

Figure 6:
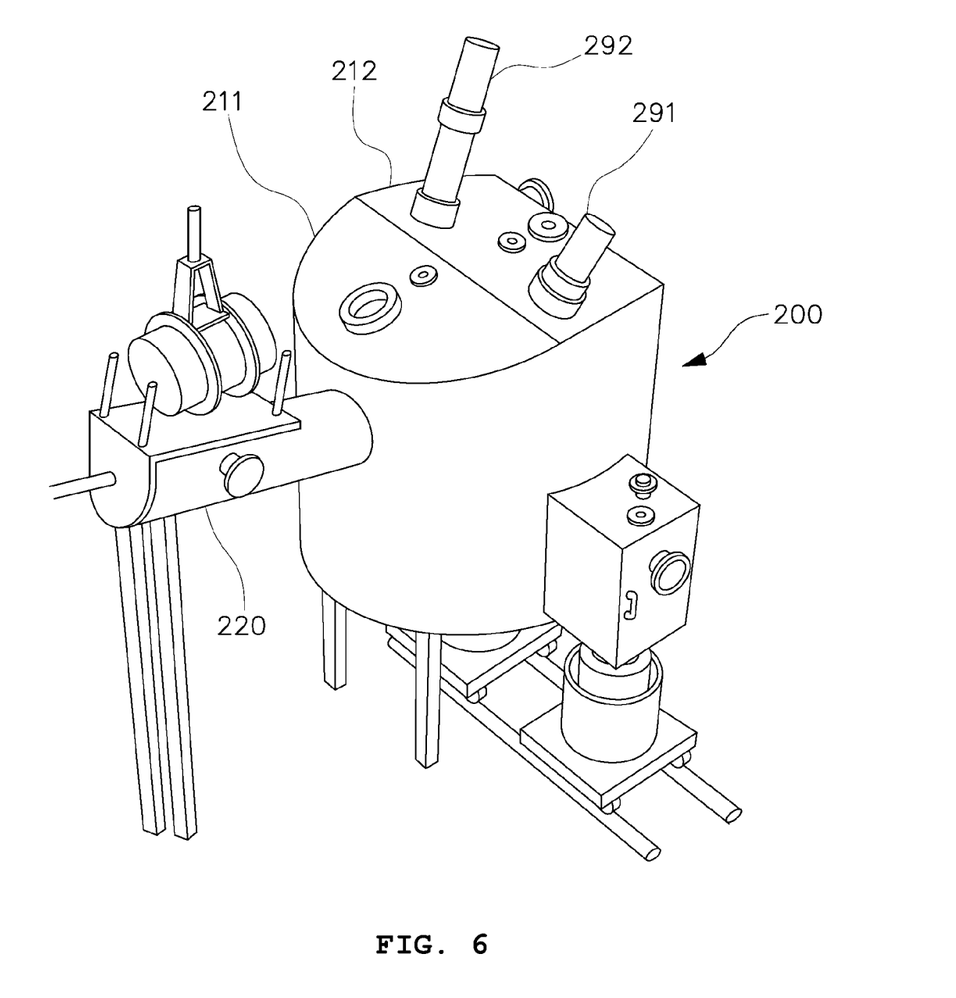
FIG. 6 is a perspective view of a plasma furnace according to a second embodiment of the present invention.
Figure 7:
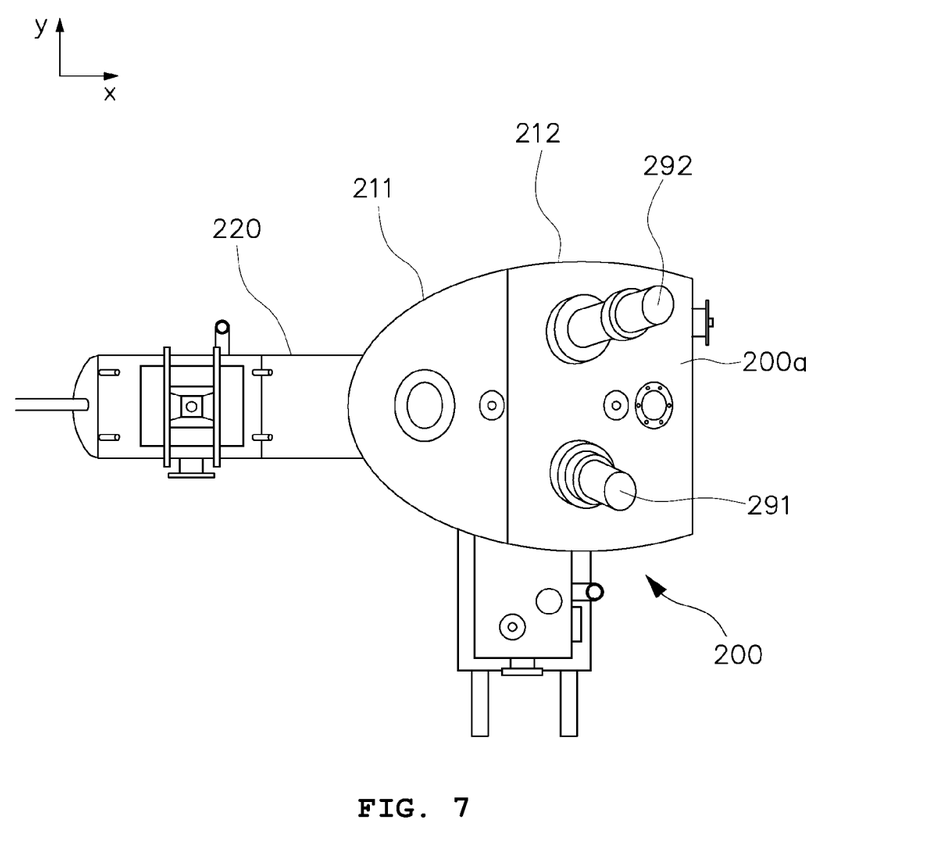
FIG. 7 is a plan view of a plasma furnace according to a second embodiment of the present invention.

FIG. 6 is a perspective view of a plasma furnace according to a second embodiment of the present invention, and FIG. 7 is a plan view of a plasma furnace according to a second embodiment of the present invention. Hereinafter, a duplicate description of the same configuration as the first embodiment will be omitted.

Referring to FIGS. 6 and 7, in the plasma furnace according to the second embodiment of the present invention, the furnace body 200 has a cylindroid shape as a whole, and the upper portion of the melting chamber is formed by the upper surface 211, 212 comprising a horizontal upper surface 211, and an inclined upper surface 212 having a predefined angle to the rear and lower direction.

Preferably, the inclined upper surface 212 is provided at one side of the furnace body 200 and is positioned to be opposite in direction to the input apparatus 220, and more preferably, the input apparatus 220 and the inclined upper surface 212 are positioned along (X-axis) the direction of major axis of the elliptical furnace body 200.

More preferably, the furnace body 200 includes a vertical lateral surface 200a that contacts the inclined upper surface 212 vertically.

As aforementioned, two mix-type plasma torches 291, 292, which can operate independently of each other, are installed symmetrically on the inclined upper surface 112.

Figure 8:
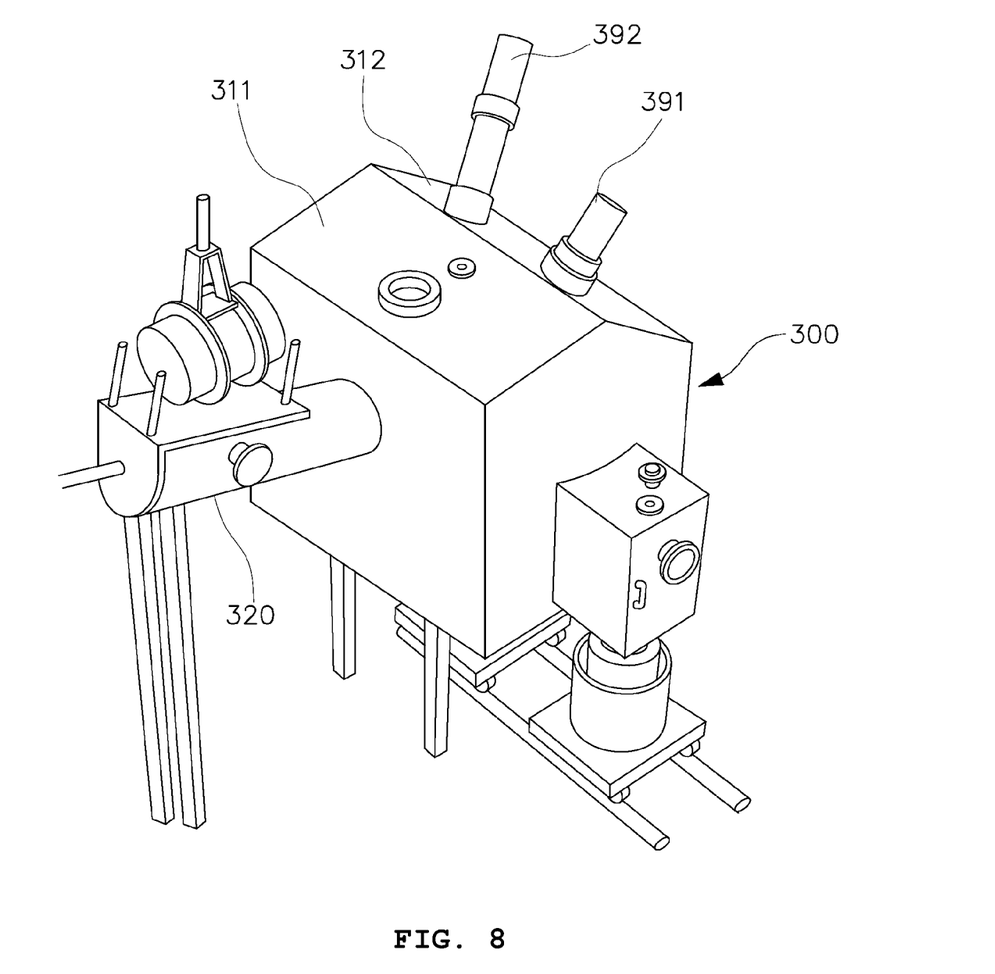
FIG. 8 8 is a perspective view of a plasma furnace according to a third embodiment of the present invention.
Figure 9:
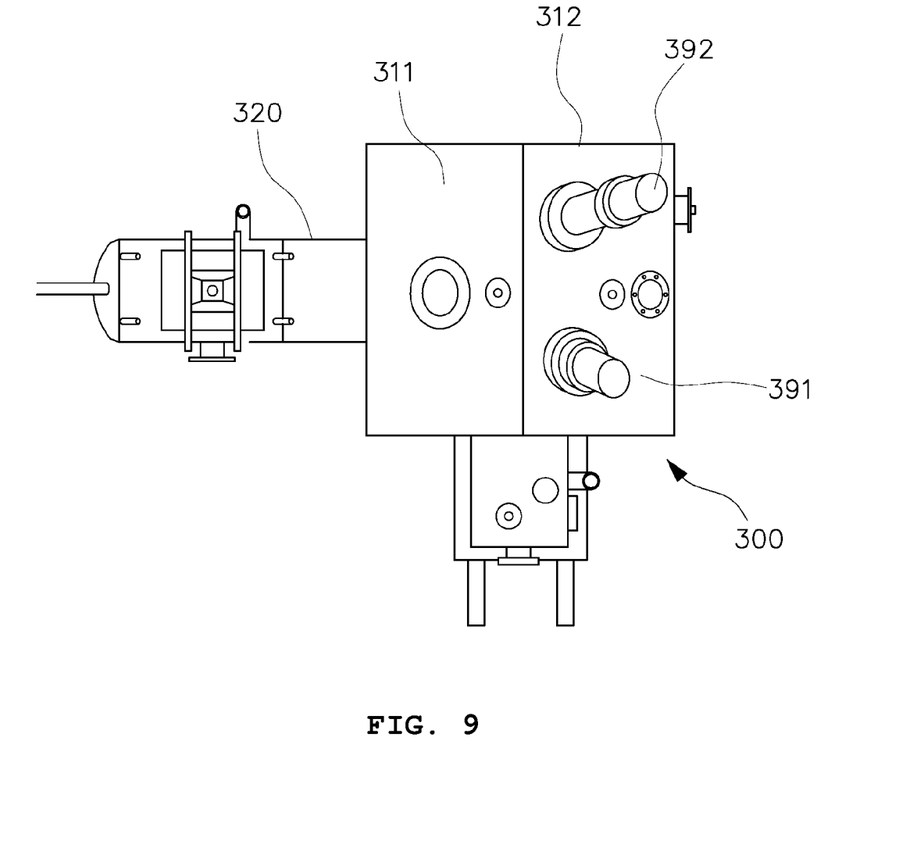
FIG. 9 is a plan view of a plasma furnace according to a third embodiment of the present invention.

FIG. 8 is a perspective view of a plasma furnace according to a third embodiment of the present invention, and FIG. 9 is a plan view of a plasma furnace according to a third embodiment of the present invention. As described above, a duplicated description of the same configuration as the first embodiment will be omitted.

Referring to FIGS. 8 and 9, in the plasma furnace according to the third embodiment of the present invention, the furnace body 300 has a polyhedral structure composed of a plurality of rectangles, which is an overall hexahedron structure except the upper surface.

The upper surface 311, 312 forming the upper portion of the melting chamber comprises a horizontal upper surface 311 and an inclined upper surface 312 having a slope to the rear and lower direction with respect to the horizontal upper surface 311.

Preferably, the inclined upper surface 312 is provided at one side of the furnace body 300 so as to be positioned opposite to the input apparatus 320 where the drum type waste is input.

It will be apparent to those skilled in the art that the present invention is not limited to the aforementioned embodiments and accompanying drawings, and various modifications and variations can be made in the present invention without departing from the spirit or scope of the general inventive concept as defined by the appended claims.

DESCRIPTION OF THE REFERENCE NUMERALS IN THE DRAWINGS

100, 200, 300: Furnace body 101: Melting chamber
102: cooling channel 111, 211, 311: horizontal upper surface
111a: upper input portion 112, 212, 312: inclined upper surface
120, 220, 320: input apparatus 121: drum waiting portion
122: pusher 123: guide support
130: dam-type discharge gate 140: first clamp
150: discharge chamber 160, 170: lateral discharge gate
181, 182: heating portion
191, 291, 391: a first plasma torch
192, 292, 392: a second plasma torch

The invention claimed is:

1. A plasma furnace comprising:
a furnace body; and
a mixed type plasma torch,
wherein the furnace body comprises a melting chamber for accommodating a melt, an upper surface forming the upper portion of the melting chamber with a horizontal upper surface and an inclined upper surface having a slope with respect to the horizontal upper surface, a melt discharge portion formed through a surface that is the lowest horizontal surface of the melting chamber for discharging molten material therethrough, and an input apparatus having a slope for inputting waste into the melting chamber, and wherein the mixed type plasma torch is provided on the inclined upper surface with a slope for generating melting heat in the melting chamber.

2. The plasma furnace according to claim 1, wherein the input apparatus and the inclined upper surface are provided in directions opposite to each other based on the furnace body.

3. The plasma furnace according to claim 1, wherein the input apparatus comprises:
a drum waiting portion provided with a slope to be charged with a waste drum;
a pusher provided movable back and forth in the drum waiting portion for pushing the waste drum into the melting chamber; and
a guide support for guiding the input of the waste drum by connecting the drum waiting portion and the lateral inlet of the furnace body.

4. The plasma furnace according to claim 3, wherein the input apparatus further comprises:
a slide gate capable of opening and closing by sliding and provided on the upper portion of the drum waiting portion; and
an input gate capable of opening and closing vertically by separating the drum waiting portion and the guide support spatially.

5. The plasma furnace according to claim 1, wherein the melt discharge portion comprises a dam-type discharge gate provided to protrude from the lower portion of the melting chamber to discharge the molten material above a predefined height.

6. The plasma furnace according to claim 5, wherein the dam-type discharge gate further comprises an induction heater.

7. The plasma furnace according to claim 1, wherein the furnace body further comprises:
at least two lateral discharge gates capable of discharging molten material at different heights on the side of the melting chamber; and
a heating portion capable of heating the lateral discharge gate.

8. The plasma furnace according to claim 7, further comprising a discharge chamber which is provided at the side of the furnace body so as to accommodate the molten material discharged along the lateral discharge gate and have an outlet formed at the lower portion thereof.

* * * * *